United States Patent
Grover et al.

(10) Patent No.: US 11,405,584 B1
(45) Date of Patent: Aug. 2, 2022

(54) SMART AUDIO MUTING IN A VIDEOCONFERENCING SYSTEM

(71) Applicant: Plantronics, Inc., Santa Cruz, CA (US)

(72) Inventors: Jonathan Grover, San Jose, CA (US); Cary Arnold Bran, Vashon, WA (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/212,475

(22) Filed: Mar. 25, 2021

(51) Int. Cl.
| | |
|---|---|
| *H04N 7/15* | (2006.01) |
| *H04L 65/403* | (2022.01) |
| *H04L 65/60* | (2022.01) |
| *G10L 15/25* | (2013.01) |
| *H04R 3/04* | (2006.01) |
| *G06V 40/16* | (2022.01) |

(52) U.S. Cl.
CPC ............. *H04N 7/15* (2013.01); *G06V 40/168* (2022.01); *G10L 15/25* (2013.01); *H04L 65/403* (2013.01); *H04L 65/60* (2013.01); *H04R 3/04* (2013.01); *H04R 2430/01* (2013.01)

(58) Field of Classification Search
CPC . H04N 7/15; H04L 29/06; H04R 3/04; H04R 29/004; G96K 8/00; G10L 15/25; G10L 25/78
USPC ........................... 348/14.01–14.16
See application file for complete search history.

(56) References Cited

U.S. PATENT DOCUMENTS

| | | | |
|---|---|---|---|
| 9,247,204 | B1 | 1/2016 | Yin et al. |
| 9,329,833 | B2 | 5/2016 | Swierk et al. |
| 9,756,187 | B2 | 9/2017 | Chintala |
| 11,082,465 | B1* | 8/2021 | Chavez ............... H04L 65/4038 |
| 2017/0251174 | A1 | 8/2017 | Bastide et al. |
| 2020/0110572 | A1* | 4/2020 | Lenke ...................... H04N 7/15 |
| 2021/0201935 | A1* | 7/2021 | Seethaler ............... H04N 7/147 |

FOREIGN PATENT DOCUMENTS

| | | |
|---|---|---|
| EP | 3448006 A1 | 7/2013 |
| WO | 2020076779 A1 | 10/2018 |

OTHER PUBLICATIONS

LipNet: End-To-End Sentence-Level Lipreading, Yannis et al., Department of Computer Science, University of Oxford, Oxford, UK, Google DeepMind, London, UK, CIFAR, Canada; 2017.

Suhasini S. Goilkar, "Speech Feature Extraction and Matching Technique", Department of Electronics and Telecommunication Engineering Assistant Professor, Finolex College of Engineering and Technology Ratnagiri, Maharashtra, India—400077, ISSN (Online): 2347-2812, vol. 4, Issue—7, 2016.

* cited by examiner

*Primary Examiner* — Melur Ramakrishnaiah

(74) *Attorney, Agent, or Firm* — Ramey LLP; Jacob B. Henry

(57) ABSTRACT

A smart muting method for a teleconference or videoconference participant includes detecting audio of an audio-video stream; analyzing video data of the audio-video stream with respect to the detected audio; determining that the audio corresponds to an intended communication, based on the analyzing video data of the audio-video stream with respect to the detected audio; and rendering the audio, responsive to determining that the audio corresponds to an intended communication.

17 Claims, 7 Drawing Sheets

US 11,405,584 B1

SMART AUDIO MUTING IN A VIDEOCONFERENCING SYSTEM

TECHNICAL FIELD

This disclosure relates generally to videoconferencing and relates particularly to systems and methods to help ensure that a participant's muted or unmuted status during a teleconference is as the user desires.

BACKGROUND

During a videoconference, people at a videoconferencing endpoint interact with people at one or more other videoconferencing endpoints. It is not uncommon for a person to speak when that person is unaware that they are muted. Likewise, it is not uncommon for a person in a teleconference to mistakenly think that their microphone is muted, when in fact audio from the microphone is being sent to other endpoints. Thus, there is room for improvement in the art.

SUMMARY

An example of this disclosure is a smart muting method, comprising detecting audio of an audio-video stream; analyzing video data of the audio-video stream with respect to the detected audio; determining that the audio corresponds to an intended communication, based on the analyzing video data of the audio-video stream with respect to the detected audio; and rendering the audio, responsive to determining that the audio corresponds to an intended communication.

Another example of this disclosure includes a teleconferencing system, comprising: a processor configured to: detect audio of an audio-video stream; analyze video data of the audio-video stream with respect to the detected audio; determine that the audio corresponds to an intended communication, based on the analyzing video data of the audio-video stream with respect to the detected audio; and render the audio, responsive to determining that the audio corresponds to an intended communication.

Another example of this disclosure includes a non-transitory computer readable memory storing instructions executable by a processor, wherein the instructions comprise instructions to: detect audio of an audio-video stream; analyze video data of the audio-video stream with respect to the detected audio; determine that the audio corresponds to an intended communication, based on the analyzing video data of the audio-video stream with respect to the detected audio; and render the audio, responsive to determining that the audio corresponds to an intended communication.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
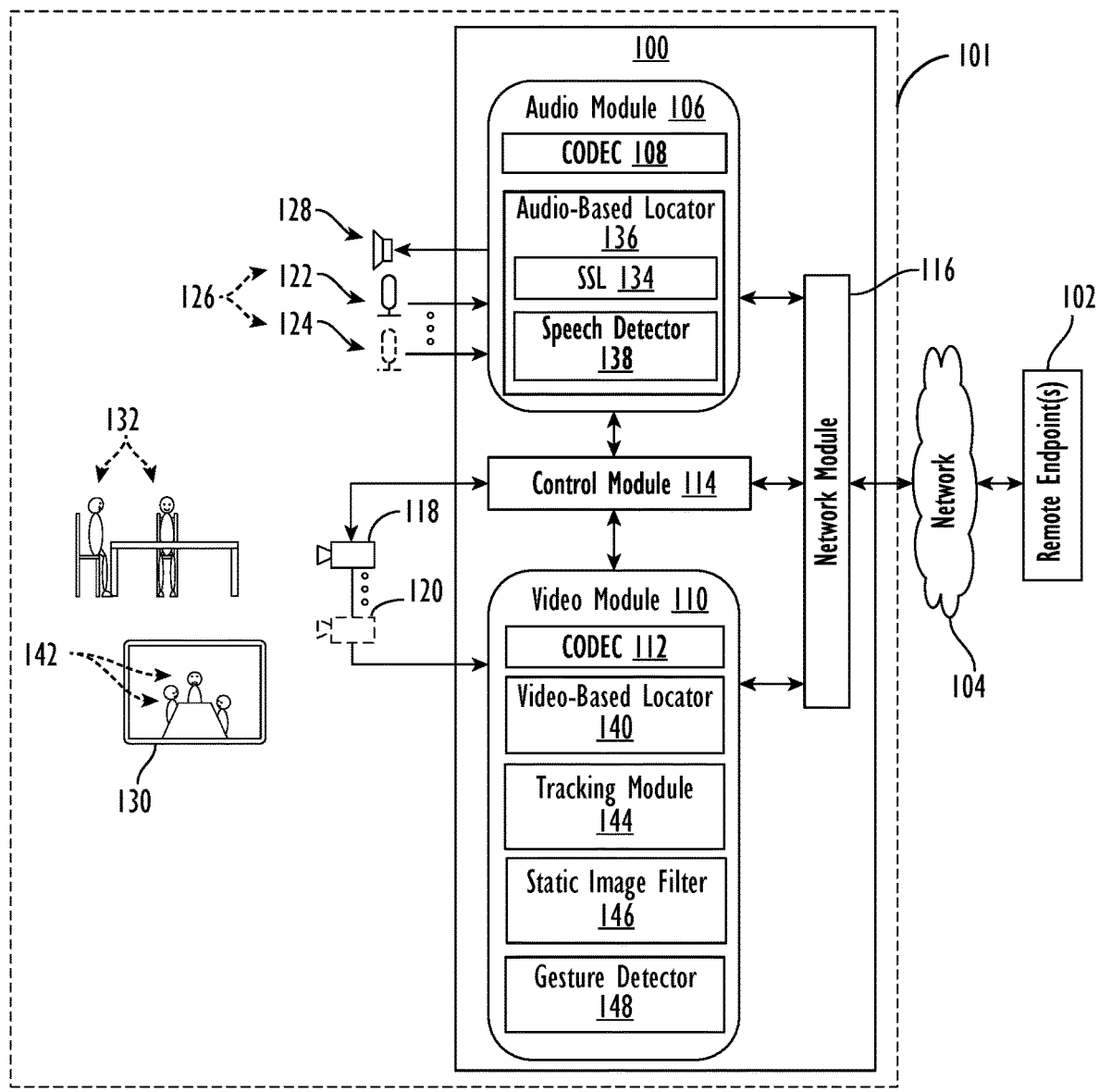
FIG. 1 illustrates a videoconferencing system, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

In at least one example of this disclosure, a videoconferencing device can detect and focus on an active talker. One or more microphones can be used to determine the direction from the videoconferencing device to the active talker. One or more microphones can be used to determine the location of a subject (e.g., an active talker), relative the microphones and/or relative one or more cameras. In one or more examples of this disclosure, one or more cameras are used to locate the face of an active talker. Based on the direction and the location, a view of the active talker can be captured for transmission to another endpoint and the active talker can be tracked during a videoconference, in accordance with one or more examples.

FIG. 1 illustrates a videoconferencing system 100 at a videoconferencing endpoint 101, in accordance with an example of this disclosure. The videoconferencing system 100 includes multiple components to provide a pleasant videoconferencing experience. The videoconferencing system 100 enables people at the videoconferencing endpoint 101 to communicate with people at one or more remote videoconferencing endpoints 102 over a network 104. Components of the (videoconferencing) system 100 include an audio module 106 with an audio codec 108, and a video module 110 with a video codec 112. Video module 110 includes a video-based locator 140, which is used to locate videoconference participants 132 during videoconferences. Video module 110 also includes a tracking module 144, which is used to track the locations of videoconference participants 132 at the videoconferencing endpoint 101. Video module 110 also includes a static image filter 146 which can be used to detect static portions of video image frames and minimize potential tracking errors. Video module 110 also includes a gesture detector 148, which can be used to detect when a (videoconference) participant 132 makes a gesture such as waving their hand or raising their hand. Audio module 106 and video module 110 are operatively coupled to a control module 114 and a network module 116. The (videoconferencing) system 100 includes and/or is coupled to least one camera 118 at the (videoconferencing) endpoint 101. The camera(s) 118 can be used to capture a video component of an audio-video data stream at the endpoint 101. Such an audio-video data stream contains a series of frames, which can include image frames and related audio; a given image frame can consist of one or more contiguous and/or non-contiguous image frames as well as one or more overlapping or non-overlapping image frames. In accordance with one or more examples of this disclosure one or more contiguous and/or non-contiguous image frames and one or more overlapping or non-overlapping image frames are regions of an image frame. In accordance with one or more examples of this disclosure, one or more contiguous and/or non-contiguous image frames and one or more overlapping or non-overlapping image frames are subregions of an image frame. In some examples of this disclosure, the endpoint 101 includes one or more additional cameras 120. The camera(s) 118 can be used to detect (video) data indicating a presence of one or more persons (e.g., participants 132) at the endpoint 101. In some examples, when a participant 132 is zoomed in upon by a camera (e.g., 118), a sub-portion of the captured image frame containing the participant 132 is rendered—e.g., displayed on a display 130 and/or transmitted to a remote endpoint 102—whereas other portions of the image frame are not.

During a videoconference, camera 118 captures video and provides the captured video to the video module 110. In at least one example of this disclosure, camera 118 is an electronic pan-tilt-zoom (EPTZ) camera. In some examples, camera 118 is a smart camera. In some examples, camera 118 is an EPTZ camera and is also a smart camera. In some examples, one or more additional cameras (e.g., 120) can be cascaded with camera 118 such that camera 118 controls some or all operations of such additional cameras. In accordance with one or more examples of this disclosure, one or more cameras (e.g., 118, 120) are releasably coupled to one or more processors of the system 100 (e.g., 208, shown in FIG. 2). Additionally, one or more microphones (e.g., 122, 124) capture audio and provide the captured audio to the audio module 106 for processing. The captured audio and concurrently captured video can form an audio-video data stream. (See preceding paragraph.) Microphone 122 can be used to detect (video) data indicating a presence of one or more persons (e.g., participants 132) at the endpoint 101. Microphone 122 can be a table or ceiling microphone or be part of a microphone pod or the like. In one or more examples, microphones 122, 124 are tightly coupled with camera 118. The system 100 can use the audio captured with microphone 122 as conference audio.

In some examples, the microphones 122, 124 can reside within a microphone array (e.g., 126) that includes both vertically and horizontally arranged microphones for determining locations of audio sources, e.g., participants 132 who are speaking. In some examples, the system 100 uses audio from one or more microphones (e.g., 122, 124) for participant tracking purposes. In some examples, the system 100 uses audio from microphones 122, 124 for camera tracking. In one or more examples, the system 100 uses audio from microphones 122, 124 to determine locations of (videoconference) participants 132.

After capturing audio and video, the system 100 encodes the captured audio and video in accordance with an encoding standard, such as MPEG-1, MPEG-2, MPEG-4, H.261, H.263 and H.264. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 101 also includes a loudspeaker 128 which outputs conference audio, and a display 130 which outputs conference video.

Using camera 118, the system 100 can capture a view of a room at the endpoint 101, which would typically include all (videoconference) participants 132 at the endpoint 101, as well as some of their surroundings. According to some examples, the system 100 uses camera 118 to capture video of one or more participants 132, including one or more current talkers, in a tight or zoom view. In at least one example, camera 118 is associated with a sound source locator (e.g., 134) of an audio-based locator (e.g., 136).

In some examples, the system 100 may alternate between presenting tight views of a speaker and wide views of a room. In accordance with some examples, the system 100 outputs a group view (e.g., 308, 608) when no participant 132 is speaking, and a person view (e.g., 411) when a participant 132 is speaking. If the system 100 determines that a participant 132 is a presenter, the system 100 can render a presenter view in a presenter viewing window. The presenter viewing window can be displayed on a display (e.g., 130) and/or transmitted to a remote endpoint 102.

In one or more examples, the system 100 may use the audio-based locator 136 and a video-based locator 140 to determine locations of participants 132 and frame views of the environment and participants 132. The control module 114 may use audio and/or video information from these locators 136, 140 to crop one or more captured views, such that one or more subsections of a captured view will be displayed on a display 130 and/or transmitted to a remote endpoint 102.

In some examples, to determine how to configure a view, the control module 114 uses audio information obtained from the audio-based locator 136 and/or video information obtained from the video-based locator 140. For example, the control module 114 may use audio information processed by the audio-based locator 136 from one or more microphones (e.g., 122, 124). In some examples, the audio-based locator 136 includes a speech detector 138 which can be used to detect speech in audio captured by microphones 122, 124 to determine a location of a current participant 132. In some examples, the control module 114 uses video information captured using camera 118 and processed by the video-based locator 140 to determine the locations of participants 132 and to determine the framing for captured views.

In some examples of this disclosure, a wide view can be used to give context to a zoom view. In some examples, camera 118 can capture both such views simultaneously insofar as the zoom view is a portion of the wide view. The magnification level of a zoom view will normally be greater than the magnification level of the wide view from which the zoom view is taken. In some examples, switching from a first view to a second view for transmission to a remote endpoint 102 will not occur until an active participant 132 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 132 at an endpoint 101, the cultural niceties of the remote participants 142 at the remote endpoint 102, and the sizes of one or more displays 130 displaying captured views.

Figure 2:
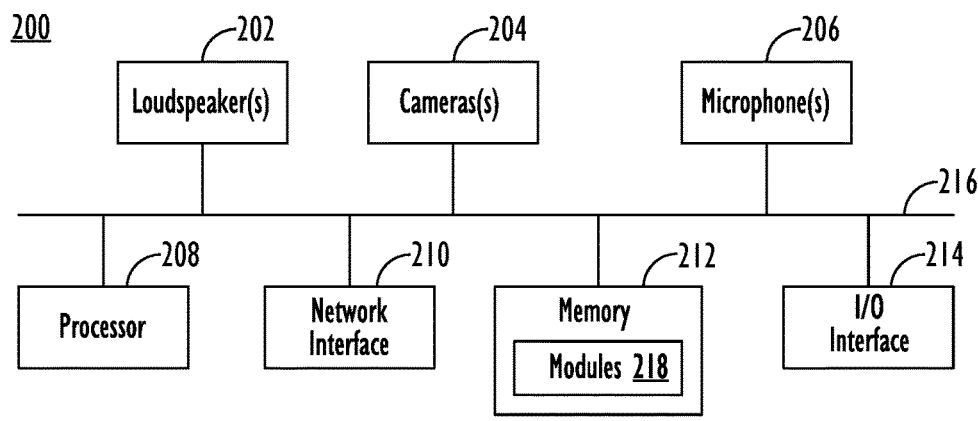
FIG. 2 illustrates aspects of the videoconferencing system, in accordance with an example of this disclosure.

FIG. 2 illustrates components 200 of the videoconferencing system 100, in accordance with an example of this disclosure. The components 200 include one or more loudspeaker(s) 202 (e.g., 128), one or more camera(s) 204 (e.g., 118) and one or more microphone(s) 206 (e.g., 122, 124). The components 200 also include a processor 208, a network interface 210, a memory 212 and a general input/output interface 214, all coupled by bus 216.

The memory 212 can be any standard memory such as SDRAM. The memory 212 stores modules 218 in the form of software and/or firmware for controlling the system 100. In addition to audio codec 108 and video codec 112, and other modules discussed previously, the modules 218 can include operating systems, a graphical user interface that enables users to control the system 100, and algorithms for processing audio/video signals and controlling the camera(s) 204. In at least one example of this disclosure, one or more of the cameras 204 can be a panoramic camera.

The network interface 210 enables communications between the endpoint 101 and remote endpoints 102. In one or more examples, the interface 210 provides data communication with local devices such as a keyboard, mouse, printer, overhead projector, display, external loudspeakers, additional cameras, and microphone pods, etc.

The camera(s) 204 and the microphone(s) 206 capture video and audio in the videoconference environment, respectively, and produce video and audio signals transmitted through bus 216 to the processor 208. In at least one example of this disclosure, the processor 208 processes the video and audio using algorithms of modules 218. For example, the system 100 processes the audio captured by the microphone(s) 206 as well as the video captured by the camera(s) 204 to determine the location of participants 132 and control and select from the views of the camera(s) 204. Processed audio and video can be sent to remote devices coupled to network interface 210 and devices coupled to general interface 214.

Figure 3:
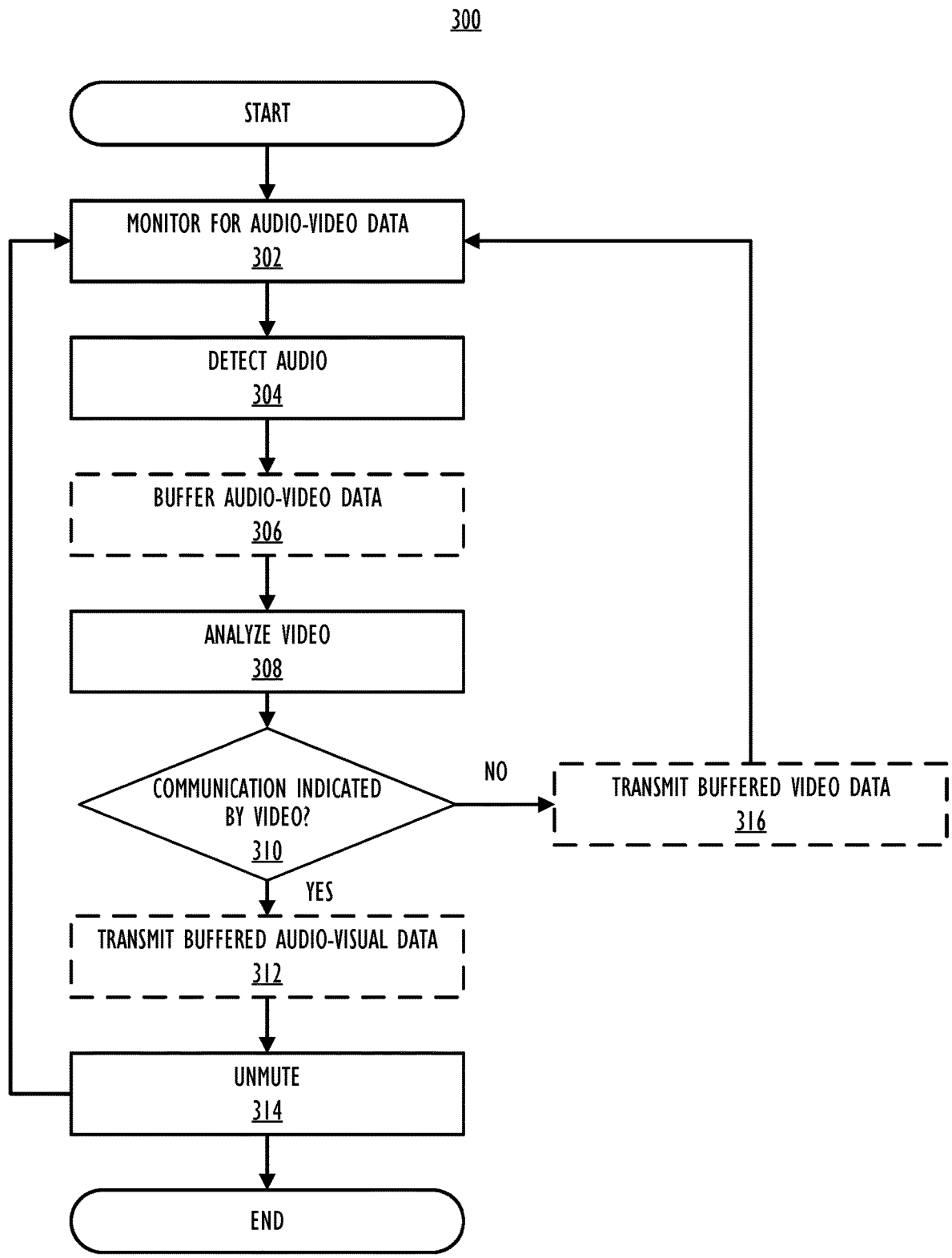
FIG. 3 illustrates a smart muting method, in accordance with an example of this disclosure.

FIG. 3 illustrates a smart muting method 300 of the system 200, in accordance with an example of this disclosure. In method 300 the system 200 uses audio input data as a trigger to initiate the process 300 shown. The system 200 begins in a state in which the participant 132 is on mute, (e.g., the system 200 is currently not transmitting audio from the participant 132 captured at its endpoint 100). The system 200 begins by monitoring 302 the user(s) at the endpoint 100. Thereafter, the system 200 detects 304 that there is audio input via an audio sensor (e.g., a headset transmit audio input). In some examples of the method 300, the system 200 buffers 306 the audio and visual input detected at the endpoint 100. Regardless of whether the audio and visual input is buffered 306, the system 200 gathers visual input (e.g., video) that corresponds to the audio input detected 304. The visual input corresponds to the detected 304 audio input in that the visual input is (at least temporally) synchronized with the video (e.g., when a person speaks sound (audio) is emitted by that person and the corresponding visual input is the movement of the person's mouth forming the sound).

The video data is then processed and analyzed 308 to determine 310 whether the user 132 was attempting to communicate verbally. For example, if the system 200 detects that a user's mouth is moving, that can be a strong indicator that the user 132 is talking, and hence intends to communicate. If the system 200 determines 310 that the user 132 was intending to communicate (e.g., convey audio information), the system 200 will, in some examples, proceed to transmit 312 the buffered data (e.g., as though the user 132 had not been on mute). If the system 200 determines 310 that a user 132 was intending to communicate (e.g., convey audio information), the system 200 will unmute 314 the user 132, e.g., audio captured at the endpoint 100 from that user 132 will be rendered, such as by transmitting the audio to a remote endpoint 102. On the other hand, if the system 200 determines that the muted user 132 was not intending to communicate (e.g., the user's lips were not moving), then the system 200 will proceed to render 316 the captured video but not the audio of the user 132. The method 300 can then end or the system 200 will continue to monitor 302 the endpoint 100 for audio-visual data. In some examples of this disclosure, the system 200 will display information on the user's display 130 relating to the user's mute status and/or a change in mute status, such as a flashing/changing mute icon, text indicating mute state, and/or a change of color. In some examples, the system 200 may output a message using a loudspeaker 202, such as "You are no longer being muted."

Figure 4:
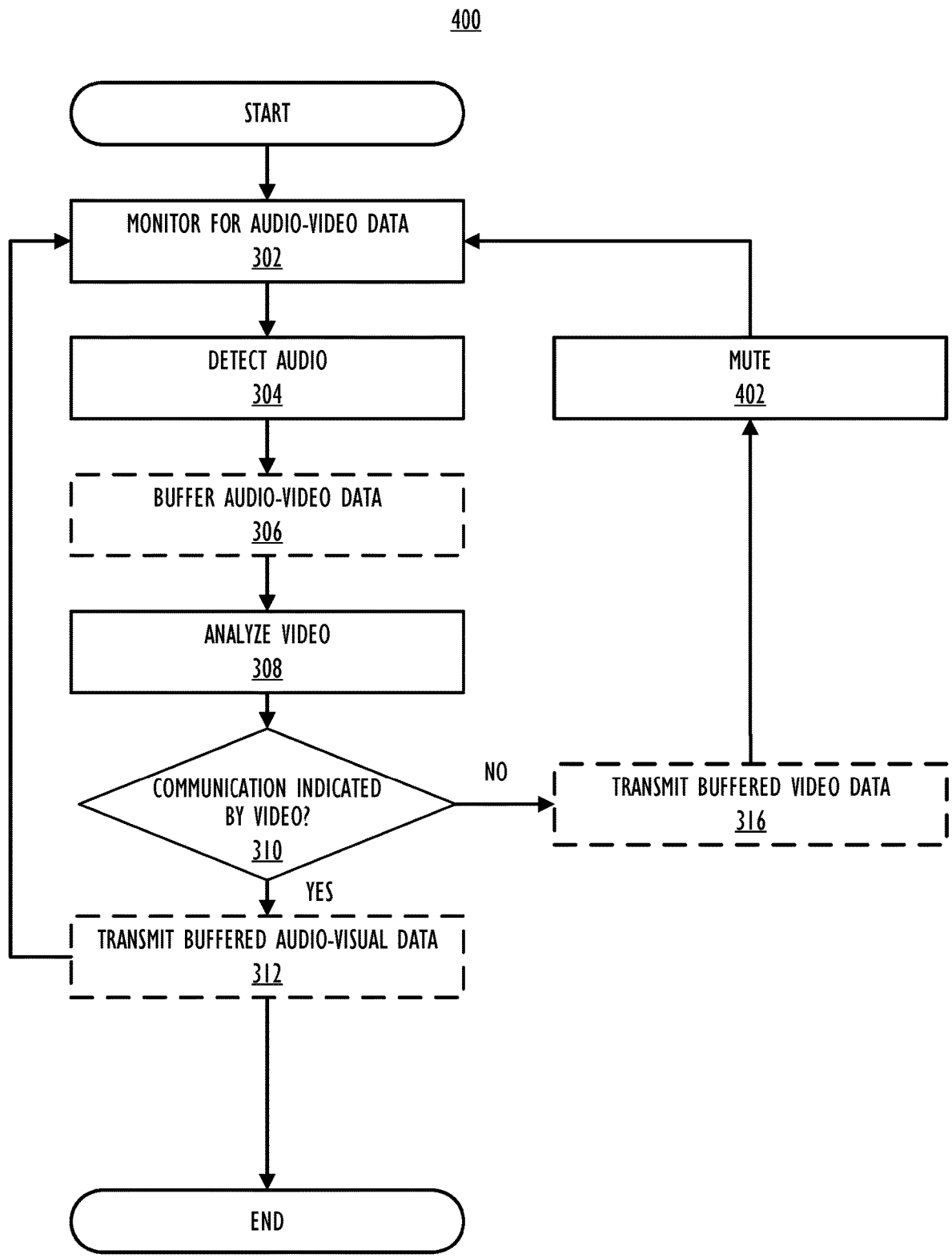
FIG. 4 illustrates another smart muting method, in accordance with an example of this disclosure.

FIG. 4 illustrates another smart muting method 400, in accordance with an example of this disclosure. As in method 300, in method 400, the system 200 uses audio input data as a trigger to initiate the process 400 shown. The system 200 begins in a state in which the participant 132 is not muted, e.g., the system 200 is currently transmitting audio captured at its endpoint 100 from the participant 132. The method 400 begins by monitoring 302 the user(s) 132 at the endpoint. Thereafter, the system 200 detects 304 that there is audio input via an audio sensor (e.g., a headset transmit audio input). In some examples of the method 400, the system 200 buffers 306 the audio and visual input detected at the endpoint 100. Regardless of whether the audio and visual input is buffered 306, the system 200 gathers visual input (e.g., video) that corresponds to the audio input detected 304. As in method 300, the visual input can correspond to the detected 304 audio input in that the visual input is (at least temporally) synchronized with the video (e.g., when a person speaks sound (audio) is emitted by that person and the corresponding visual input is the movement of the person's mouth forming the sound).

The video data is then processed and analyzed 308 to determine 310 whether a user 132 was attempting to communicate verbally. For example, if the system 200 detects that a user's mouth is moving, that can be a strong indicator that the user 132 is talking, and hence intends to communicate. If the system 200 determines 310 that the user 132 was intending to communicate (e.g., convey audio information), the system 200 will, in some examples, proceed to transmit 312 the buffered data (e.g., as though the user 132 had not been on mute). If the system 200 determines 310 that the user 132 was intending to communicate (e.g., convey audio information), the system 200 will allow audio captured at the endpoint 100 from that user 132 to continue to be rendered, such as by transmitting the audio from that user 132 to a remote endpoint 102. On the other hand, if the system 200 determines 310 that the user 132 was not intending to communicate (e.g., the user's lips were not moving), then the system 200 will proceed to render 316 the captured video but not the audio from the user 132. The system 200 will then mute 402 the user 132, e.g., audio from the user 132 will not be transmitted. The system 200 will continue to monitor 302 the endpoint 100 for audio-visual data. In some examples of this disclosure, the system 200 will display information on the user's display 130 relating to the user's mute status and/or a change in mute status, such as a flashing/changing mute icon, text indicating mute state, and/or a change of color. In some examples, the system 200 may output a message using a loudspeaker 202, such as "You are no longer being muted, please select mute when you are done talking."

Figure 5:
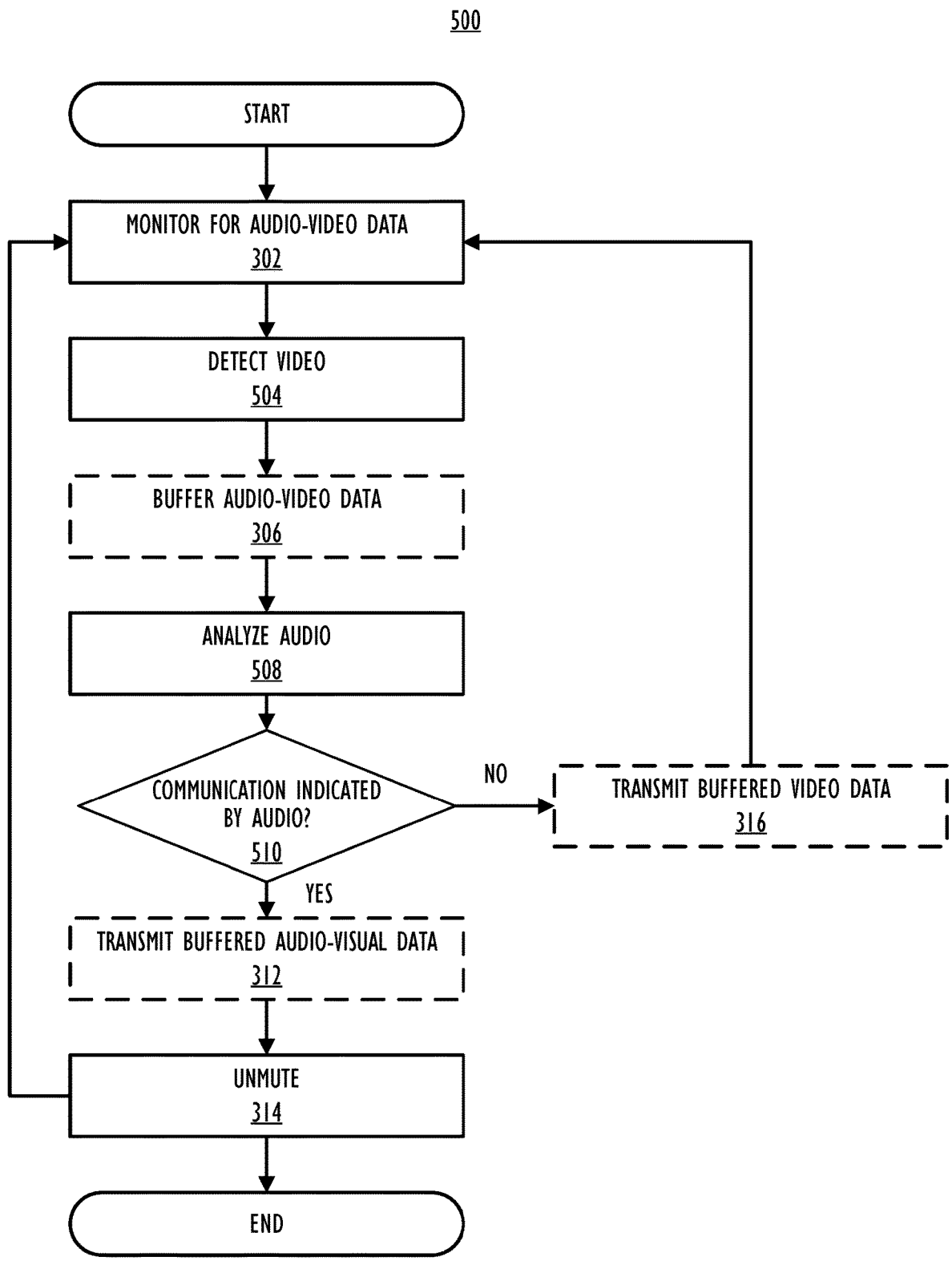
FIG. 5 illustrates another smart muting method, in accordance with an example of this disclosure.

FIG. 5 illustrates another smart muting method 500, in accordance with an example of this disclosure. In method 500, the system 200 uses detected video as a triggering event. In method 500, the system 200 begins in a state in which the participant 132 is on mute, (e.g., the system 200 is currently not transmitting audio from the participant 132 captured at its endpoint 100). The system 200 begins by monitoring 302 the user 132 at the endpoint 100. Thereafter, the system 200 detects 504 that there is video input at the endpoint 100 (e.g., using a camera 204). In some examples of the method 500, the system 200 buffers 306 the audio and visual input detected at the endpoint 100. Regardless of whether the audio and visual input is buffered 306, the system 200 gathers audio input (e.g., audio data) that corresponds to the video input detected 504. The audio input corresponds to the detected 504 video input in that the visual input is (at least temporally) synchronized with the video (e.g., when a person speaks sound (audio) is emitted by that person and the corresponding visual input is the movement of the person's mouth forming the sound).

The audio data is then processed and analyzed 508 to determine 510 whether the user 132 was attempting to communicate verbally. For example, if the system 200 detects that the user 132 is producing sounds corresponding to words, that can be a strong indicator that the user 132 is talking with the intent to communicate. If the system 200 determines 510 that the user 132 was intending to communicate (e.g., convey audio information), the system 200 will, in some examples, proceed to transmit 312 the buffered data (e.g., as though the user 132 had not been on mute). If the system 200 determines 310 that the user 132 was intending to communicate (e.g., convey audio information), the system 200 will unmute 314 the user 132, e.g., audio captured from the user 132 at the endpoint 100 will be rendered, such as by transmitting the audio to a remote endpoint 102. On the other hand, if the system 200 determines 510 that the muted user 132 was not intending to communicate (e.g., speech was not detected), then the system 200 will proceed to render 316 the captured video but not the audio. The method 500 can then end or the system 200 will continue to monitor 302 the endpoint 100 for audio-visual data.

Figure 6:
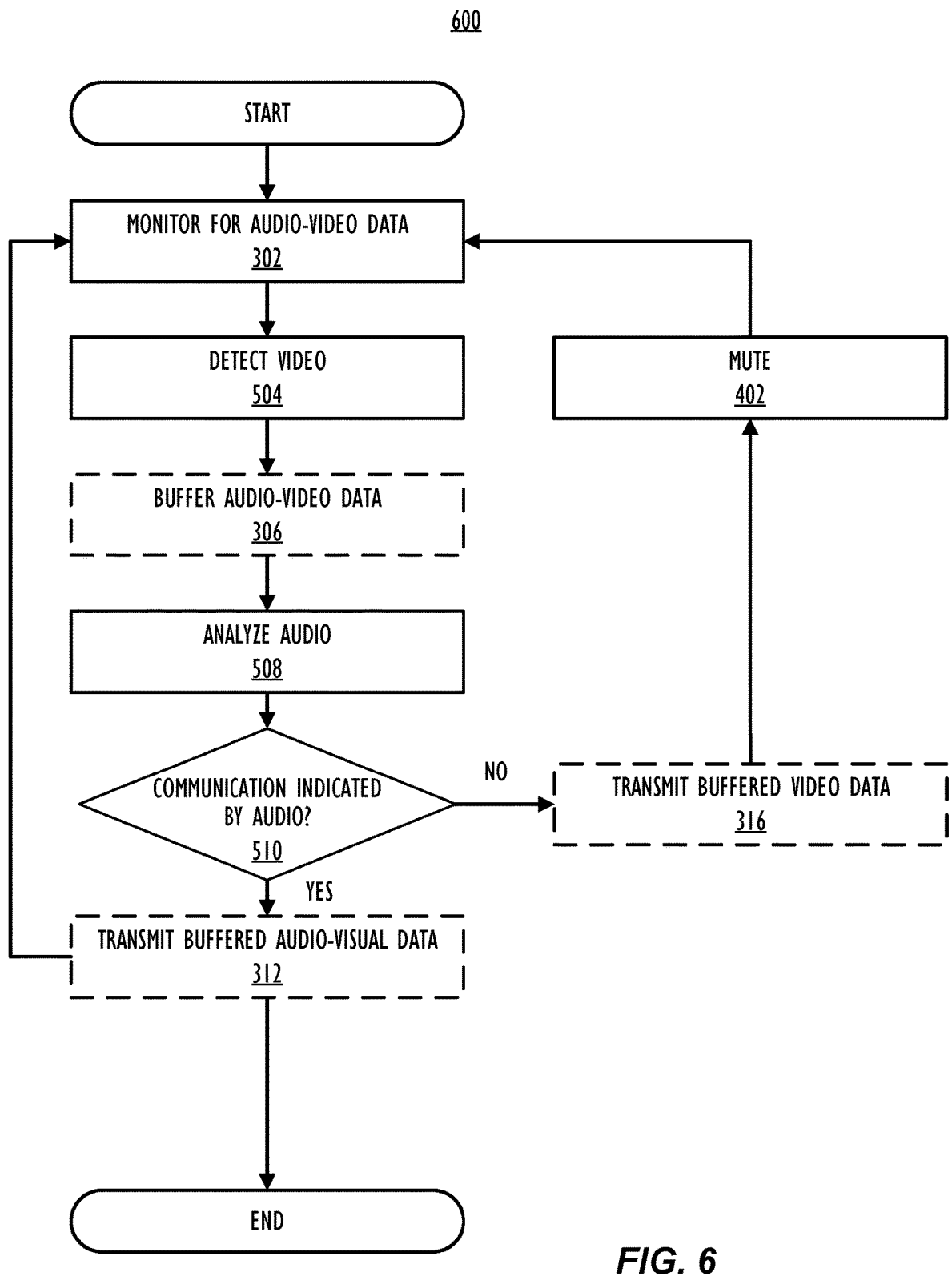
FIG. 6 illustrates another smart muting method, in accordance with an example of this disclosure.

FIG. 6 illustrates another smart muting method 600, in accordance with an example of this disclosure. As in method 500, in method 600, the system 200 uses video input data as a trigger to initiate the process 600 shown. The system 200 begins in a state in which the participant 132 is not muted, e.g., the system 200 is currently transmitting audio captured at its endpoint 100. The method 600 begins by monitoring 302 the user 132 at the endpoint. Thereafter, the system 200 detects 504 that there is video input corresponding to talking at the endpoint 100. In some examples of the method 600, the system 200 buffers 306 the audio and visual input detected at the endpoint 100. Regardless of whether the audio and visual input is buffered 306, the system 200 gathers audio input (e.g., detected sound) that corresponds to the video input detected 504. As in method 500, the visual input can correspond to the detected 504 audio input in that the auditory input is (at least temporally) synchronized with the video.

The audio data is then processed and analyzed 508 to determine 510 whether the user 132 was attempting to communicate verbally. For example, if the system 200 detects that the user 132 is talking, that will usually mean that the user 132 is trying to communicate. If the system 200 determines 310 that the user 132 was intending to communicate (e.g., convey audio information), the system 200 will, in some examples, proceed to transmit 312 the buffered data (e.g., as though the user 132 had not been on mute). If the system 200 determines 310 that the user 132 was intending to communicate (e.g., convey audio information), the system 200 will allow audio captured at the endpoint 100 from that user 132 to continue to be rendered, such as by transmitting the audio to a remote endpoint 102. On the other hand, if the system 200 determines 510 that the user 132 was not intending to communicate (e.g., the user's lips were not moving), then the system 200 will proceed to render 316 the captured video but not the audio from the user 132 in question (while of course audio from a different user at the endpoint 100 could continue to be rendered). The system 200 will then mute 402 the user 132, e.g., audio from the user 132 will not be transmitted. The system 200 will continue to monitor 302 the endpoint 100 for audio-visual data.

In each of the foregoing examples (as well as those described below), the system 200 can discriminate speech from one or more active talkers from other auditory data not corresponding to an intent to communicate, such as noise, side conversations, etc.

As noted, aspects of this disclosure pertain to passive assessing a user's desire to be on mute or unmute without requiring the user 132 to make an affirmative selection (e.g., toggling a mute button). The process of passive intent indication infers the user's intent based on the assessment of user's body activity using machine learning models. (The machine learning model may be trained using backpropagation to update the weights of the machine learning model.) In some examples of this disclosure that utilize passive assessment a confidence index is employed to transform visual input to useful data. The transformation may be sufficient to create a confidence score (as that would be the purpose of the transformation) or the transformation may be further compared to the audio input and the combination used to create a confidence score. In some examples, when a confidence score for audio and/or video meets a predetermined threshold, that audio and/or video data will be construed by the system 200 as indicating that a user 132 intends to communicate.

In one or more examples of this disclosure, passive intent assessment involves lip reading and/or detection of mouth movement. In such situations, the system 200 seeks to determine if information derived from the user's mouth movements corresponds to information derived from audio captured during the same period. Various ways of using machine learning to "lip read" are available in the literature, including LipNet by Assael, which is entirely incorporated by reference herein.

In at least one example of this disclosure, the audio detected may be processed through an artificial speech recognition unit for comparison. For example, if processed audio corresponds to text reading "John Smith likes apples," and the output of a lip-reading analysis similarly corresponds to "John Smith likes apples," then the system 200 will infer that the user 132 intended to communicate and should not be muted. Various ways of extracting speech and determining the degree to which one extract matches with another are available in the literature, including Speech Feature Extraction and Matching Technique by Goilkar, which is entirely incorporated by reference herein.

Figure 7:
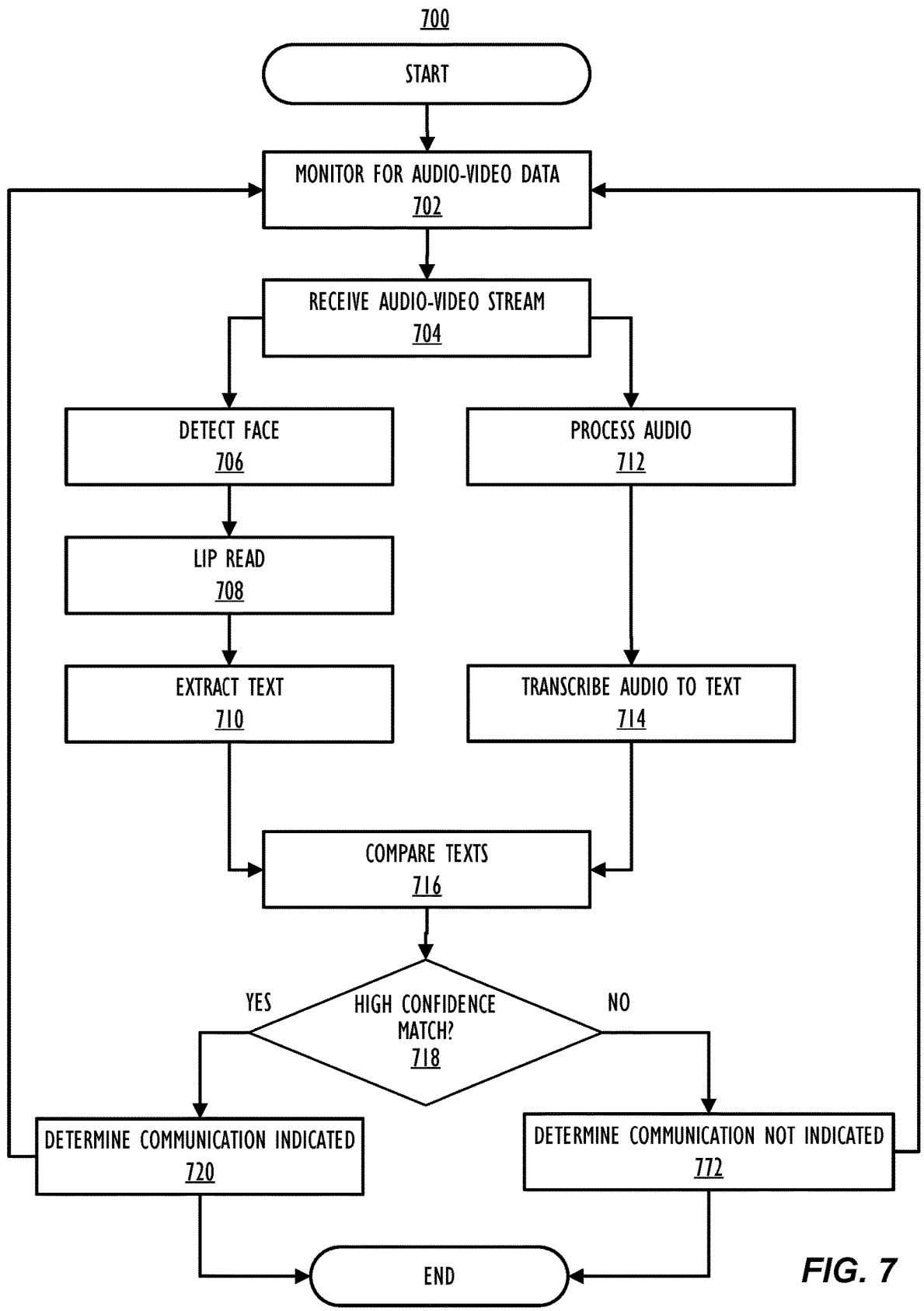
FIG. 7 illustrates aspects of a smart muting method, in accordance with an example of this disclosure.

FIG. 7 illustrates aspects of a smart muting method 700, in accordance with an example of this disclosure. FIG. 7 illustrates an example of applied passive intent assessment works (e.g., for a single user 132 in view of the video field of capture.) According to the method 700, an endpoint 100 is monitored 702. When the system 200 receives 704 an audio-video stream, the system 200 detects 706 a face within the stream and proceeds to read 708 the lips of the face. Text corresponding to words indicated by the lip movements is extracted 710. The audio from the stream is processed 712 in parallel and transcribed 714 into text. The extracted 710 text and the transcribed 714 text are compared 716 to generate 718 a confidence score.

Comparing 716 'lip text', from 710, to 'audio text', from 714, occurs over various time-shifted windows". Because of factors such as (i) imperfect machine lip reading, (ii) imperfect audio transcription and (iii) latency introduced in processing, the system 200 compares multiple windows of 'lip text' to multiple windows of 'audio text' to try to find a high confidence match. If the confidence score meets a predetermined threshold (e.g., 80 percent), the system 200 will determine 720 that a communication was intended. If the confidence score does not meet the predetermined threshold (e.g., 85 percent), the system 200 will determine 722 that a communication was not intended.

Examples of this disclosure include embodiments in which there are multiple audio sources (e.g., multiple microphones). In such an embodiment, the 'lip text' can be compared to the 'audio text' from each of the audio streams, and the system 200 would determine which of the audio streams/sources is the one containing communication, whereas the others do not. In some examples, when multiple audio streams/sources are present, but at different confidence levels, the identification of the highest confidence match would be indicative of the audio sources that most closely follows the 'lip text'. This could thus be inferred as the "right" or "best quality" audio source to be using—in a multi-microphone situation, this would allow the system to dynamically select the best microphone to be using for audio input based on the match to 'lip text'. In some examples, when the better microphone is selected for the current audio pickup, pickup from other microphones at the endpoint can be muted, at least temporarily.

Figure 8:
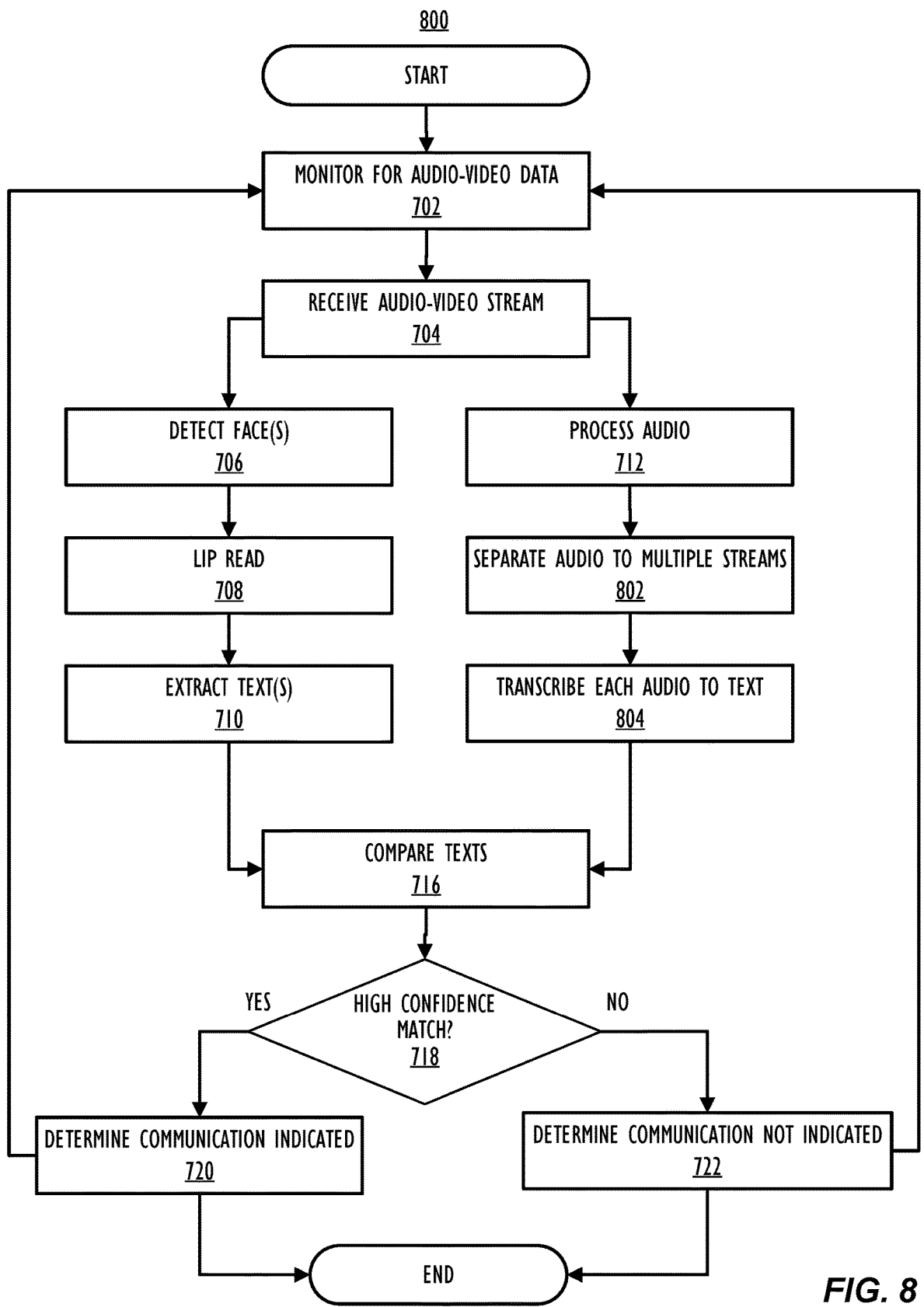
FIG. 8 illustrates aspects of another smart muting method, in accordance with an example of this disclosure.

FIG. 8 illustrates aspects of another smart muting method 800, in accordance with an example of this disclosure. In accordance with the method 800, the system 200 assumes that in a sidebar conversation people face each other, and not the video source camera, so that lip reading (and thus lip text) will not be determined on the sidebar conversation. On the other hand, the audio stream still picks up all the conversations (both intended communication and sidebar conversation).

In the approach taken by method 800, the audio stream goes through speaker separate processing (which in another embodiment may be pre-separated based on multiple microphones). Each speaker separated audio stream is transcribed into "audio text" with the same comparison done as in FIG. 7. However, since the "lip text" can only pick up the intended communication and not the sidebar, the system 200 is able to identify what audio is sidebar and not intended communication. Sidebar audio could then be removed/muted from the audio stream (following the processing in FIG. 8), so that the only communication audio stream data is being transmitted. In some examples of this disclosure, multiple lip readings from multiple people can indicate that multiple people are talking, and the system 200 can include audio intended as a communication from multiple sources for the far end 101, while side bar communications etc. are blocked from transmission.

According to the method 800, an endpoint 100 is monitored 702. When the system 200 receives 704 an audio-video stream, the system 200 detects 706 one or more faces within the stream and proceeds to read 708 the lips of the face(s). Text corresponding to words indicated by the lip movements of each face is extracted 710 if possible (e.g., as noted above, lip movements from sidebar conversations will not be read).

The audio from the stream is processed 712 in parallel and audio from different people at the endpoint 100 is separated 802 into separate streams and transcribed 804 into text. The extracted 710 text(s) is/are compared 716 with the transcribed 804 text from each speaker, and a confidence score for each person is generated 718. If the confidence score any of the person's audio satisfies a predetermined threshold, the system 200 will determine 720 that a communication was intended by that person. If the confidence score does not meet the predetermined threshold, the system 200 will determine 722 that a communication was not intended.

In another embodiment the system 200 can record and persist the false positives and successes in the determination of intended communication. In some examples, this is done by aligning the output of this determination (and the subsequent logical actions taken by system 200) to a user 132 change of state rapidly (in a short time) after the actions have been taken by the system 200. For example, if the system 200 mutes the user 132, but very quickly the user 132 unmutes themselves with a "button" this may indicate a false/incorrect determination based on such user selections/inputs. Using this data, the machine learning models applied in the various embodiments of both active and passive embodiments could be further tuned/trained specific to the user 132 to enhance the output of the determination component.

In some examples of this disclosure, there may be multiple sensors/devices that could be leveraged. For example, a person could be sitting in front of the computer using a video camera and headset, but there may be a phone elsewhere in the room that has a microphone on it. In such a scenario the input (audio or video) from that/those other device(s) could be used as additional data inputs to enhance/diminish the confidence score reached in a determination. In this example, if both the phone and headset detect another person speaking, the data from the phone detection could be leveraged to determine that it was not me speaking (with higher confidence than just using the headset audio input alone).

Other examples may be more complex, such as where the audio input provided is coming from a plethora of audio input sources, and not just a single source. An example of such a device could be a speakerphone with multiple microphones, where the audio pickup from each microphone is available to the system 200 for processing.

In at least one example, there are three microphones, in which microphone A contains communication audio data corresponding to the visual, whereas microphones B and C do not. In such a scenario, the audio data from microphone A would be sent and microphone A unmuted, while microphones B and C would not have their data sent and would be muted. This would of course be accompanied by the appropriate visual data being transmitted.

In some examples, there are three microphones, in which none of microphone A, B or C contain communication audio data. In such a scenario, microphones A, B and C would not have their data sent and would be muted. This would of course be accompanied by the appropriate visual data being transmitted.

In at least one example, there are three microphones, in which microphones A and B contains communication audio data corresponding to the visual, whereas microphone C does not. In such a scenario, the audio data from microphones A and B would be sent and microphones A and B unmuted, while microphone C would not have its data sent and would be muted. This would be accompanied by the appropriate visual data being transmitted.

Examples of this disclosure include:

1. A (processor-based) smart muting method, comprising: detecting (304) audio of an audio-video stream; analyzing (308) video data of the audio-video stream with respect to the detected (304) audio; determining (310) that the audio corresponds to an intended communication, based on the analyzing (308) video data of the audio-video stream with respect to the detected (304) audio; and rendering the audio, responsive to determining (310) that the audio corresponds to an intended communication.

2. The method of example 1, wherein detecting (304) audio of the audio-data stream comprises buffering the audio-data stream.

3. The method of example 2, wherein rendering the audio, responsive to determining (310) that the audio corresponds to an intended communication comprises transmitting the buffered audio-data stream to a remote endpoint.

4. The method of example 1, wherein analyzing video data of the audio-video stream with respect to the detected audio comprises determining (710) a first set of text corresponding to lip movements.

5. The method of example 4, wherein analyzing video data of the audio-video stream with respect to the detected audio comprises determining (714) a second set of text corresponding the audio of audio-video stream.

6. The method of example 5, wherein determining (310) that the audio corresponds to an intended communication comprises determining that a degree to which the first set of text and the second set of text correspond exceeds a predetermined threshold.

7. The method of example 6, wherein the predetermined threshold corresponds to a degree of seventy-five percent.

8. A teleconferencing system, comprising: a processor configured to: detect (304) audio of an audio-video stream; analyze video data of the audio-video stream with respect to the detected audio; determine that the audio corresponds to an intended communication, based on the analyzing video data of the audio-video stream with respect to the detected audio; and render the audio, responsive to determining (310) that the audio corresponds to an intended communication.

9. The teleconferencing system of example 8, wherein the processor is further configured to detect (304) audio of the audio-data stream comprises buffering the audio-data stream.

10. The teleconferencing system of example 9, wherein the processor is further configured to render the audio, responsive to determining (310) that the audio corresponds to an intended communication by transmitting the buffered audio-data stream to a remote endpoint.

11. The teleconferencing system of example 8, wherein analyzing video data of the audio-video stream with respect to the detected audio comprises determining a first set of text corresponding to lip movements.

12. The teleconferencing system of example 11, wherein the processor is further configured to analyze video data of the audio-video stream with respect to the detected audio comprises by determining a second set of text corresponding the audio of audio-video stream.

13. The teleconferencing system of example 12, wherein the processor is further configured to determine (310) that the audio corresponds to an intended communication by determining that a degree to which the first set of text and the second set of text correspond exceeds a predetermined threshold.

14. The teleconferencing system of example 13, wherein the predetermined threshold corresponds to a degree of seventy-five percent.

15. A non-transitory computer readable memory storing instructions executable by a processor, wherein the instructions comprise instructions to: detect (304) audio of an audio-video stream; analyze video data of the audio-video stream with respect to the detected audio; determine that the audio corresponds to an intended communication, based on the analyzing video data of the audio-video stream with respect to the detected audio; and render the audio, responsive to determining (310) that the audio corresponds to an intended communication.

16. The memory of example 15, wherein the instructions to detect (304) audio of the audio-data stream comprise instructions to buffer the audio-data stream.

17. The memory of example 16, wherein the instructions to rendering the audio, responsive to determining (310) that the audio corresponds to an intended communication comprises transmitting the buffered audio-data stream to a remote endpoint.

18. The memory of example 15, wherein the instructions to analyzing video data of the audio-video stream with respect to the detected audio comprise instructions to determine a first set of text corresponding to lip movements.

19. The memory of example 18, wherein the instructions to analyze video data of the audio-video stream with respect to the detected audio comprise instructions to determine a second set of text corresponding the audio of audio-video stream.

20. The memory of example 19, wherein the instructions to determine that the audio corresponds to an intended communication comprise instructions to determine that a degree to which the first set of text and the second set of text correspond exceeds a predetermined confidence value.

The various examples described above are provided by way of illustration and should not be construed to limit the scope of the disclosure. Various modifications and changes can be made to the principles and examples described herein without departing from the scope of the disclosure and without departing from the claims which follow.

The invention claimed is:

1. A smart muting method, comprising:
   detecting, using a processor, audio of an audio-video stream;
   analyzing, using the processor, video data of the audio-video stream with respect to the detected audio;
   determining, using the processor, that the audio corresponds to an intended communication, based on the analyzing video data of the audio-video stream with respect to the detected audio; and
   rendering, using the processor, the audio, responsive to determining that the audio corresponds to an intended communication,
   wherein analyzing video data of the audio-video stream with respect to the detected audio comprises determining a first set of text corresponding to lip movements.

2. The method of claim 1, wherein detecting audio of the audio-video stream comprises buffering the audio of the audio-video stream.

3. The method of claim 2, wherein rendering the audio, responsive to determining that the audio corresponds to an intended communication comprises transmitting the buffered audio of the audio-video stream to a remote endpoint.

4. The method of claim 1, wherein analyzing video data of the audio-video stream with respect to the detected audio further comprises determining a second set of text corresponding to the audio of the audio-video stream.

5. The method of claim 4, wherein determining that the audio corresponds to an intended communication comprises determining that a degree to which the first set of text and the second set of text correspond exceeds a predetermined threshold.

6. The method of claim 5, wherein the predetermined threshold corresponds to a degree of seventy-five percent.

7. A teleconferencing system, comprising:
a processor configured to:
detect audio of an audio-video stream;
analyze video data of the audio-video stream with respect to the detected audio;
determine that the audio corresponds to an intended communication, based on the analyzing video data of the audio-video stream with respect to the detected audio;
and render the audio, responsive to determining that the audio corresponds to an intended communication,
wherein analyzing video data of the audio-video stream with respect to the detected audio comprises determining a first set of text corresponding to lip movements.

8. The teleconferencing system of claim 7, wherein the processor is further configured to detect audio of the audio-video stream by buffering the audio of the audio-video stream.

9. The teleconferencing system of claim 8, wherein the processor is further configured to render the audio, responsive to determining that the audio corresponds to an intended communication by transmitting the buffered audio of the audio-video stream to a remote endpoint.

10. The teleconferencing system of claim 7, wherein the processor is further configured to analyze video data of the audio-video stream with respect to the detected audio by determining a second set of text corresponding the audio of the audio-video stream.

11. The teleconferencing system of claim 10, wherein the processor is further configured to determine that the audio corresponds to an intended communication by determining that a degree to which the first set of text and the second set of text correspond exceeds a predetermined threshold.

12. The teleconferencing system of claim 11, wherein the predetermined threshold corresponds to a degree of seventy-five percent.

13. A non-transitory computer readable memory storing instructions executable by a processor, wherein the instructions comprise instructions to:
detect audio of an audio-video stream;
analyze video data of the audio-video stream with respect to the detected audio;
determine that the audio corresponds to an intended communication, based on the analyzing video data of the audio-video stream with respect to the detected audio; and
render the audio, responsive to determining that the audio corresponds to an intended communication,
wherein the instructions to analyze video data of the audio-video stream with respect to the detected audio comprise instructions to determine a first set of text corresponding to lip movements.

14. The memory of claim 13, wherein the instructions to detect audio of the audio-video stream comprise instructions to buffer the audio of the audio-video stream.

15. The memory of claim 14, wherein the instructions to render the audio, responsive to determining that the audio corresponds to an intended communication comprise instructions to transmit the buffered audio of the audio-video stream to a remote endpoint.

16. The memory of claim 13, wherein the instructions to analyze video data of the audio-video stream with respect to the detected audio comprise instructions to determine a second set of text corresponding to the audio of the audio-video stream.

17. The memory of claim 16, wherein the instructions to determine that the audio corresponds to an intended communication comprise instructions to determine that a degree to which the first set of text and the second set of text correspond exceeds a confidence value established responsive detection of one or more user selections.

* * * * *